(12) United States Patent
Toth et al.

(10) Patent No.: US 9,165,348 B2
(45) Date of Patent: *Oct. 20, 2015

(54) STOCHASTIC RASTERIZATION WITH SELECTIVE CULLING

(75) Inventors: Robert M. Toth, Lund (SE); Tomas G. Akenine-Moller, Lund, SC (US); Carl J. Munkberg, Malmo (SE)

(73) Assignee: Intel Corporation, Santa Clara, CA (US)

( * ) Notice: Subject to any disclaimer, the term of this patent is extended or adjusted under 35 U.S.C. 154(b) by 143 days.

This patent is subject to a terminal disclaimer.

(21) Appl. No.: 13/995,192

(22) PCT Filed: Nov. 21, 2011

(86) PCT No.: PCT/US2011/061726
§ 371 (c)(1),
(2), (4) Date: Jun. 18, 2013

(87) PCT Pub. No.: WO2012/177282
PCT Pub. Date: Dec. 27, 2012

(65) Prior Publication Data
US 2013/0287314 A1     Oct. 31, 2013

Related U.S. Application Data

(60) Provisional application No. 61/500,189, filed on Jun. 23, 2011.

(51) Int. Cl.
G06K 9/40     (2006.01)
*G06T 5/00*     (2006.01)
*G06T 15/40*     (2011.01)
*G06T 15/50*     (2011.01)

(52) U.S. Cl.
CPC .............. *G06T 5/006* (2013.01); *G06T 15/40* (2013.01); *G06T 15/503* (2013.01)

(58) Field of Classification Search
USPC .......... 382/167, 254, 274, 275; 345/419–423, 345/426–427, 430, 505, 581, 586, 606, 620, 345/629, 631; 355/53, 55
See application file for complete search history.

(56) References Cited

U.S. PATENT DOCUMENTS 6,057,847 A  *  5/2000  Jenkins ......................... 345/422
6,111,584 A  *  8/2000  Murphy ........................ 345/582
6,480,205 B1 * 11/2002  Greene et al. ................. 345/631
6,664,959 B2    12/2003  Duluk, Jr.

(Continued)

FOREIGN PATENT DOCUMENTS

TW    201008251    2/2010
TW    201107898    3/2011

OTHER PUBLICATIONS

PCT International Search Report and Written Opinion issued in corresponding PCT/US2011/061726 dated Jul. 9, 2012, (9 pages).

(Continued)

*Primary Examiner* — Amir Alavi
(74) *Attorney, Agent, or Firm* — Trop, Pruner & Hu, P.C.

(57) ABSTRACT

Depth of field may be rasterized by culling half-space regions on a lens from which a triangle to be rendered is not visible. Then, inside tests are only performed on the remaining unculled half-space regions. Separating planes between the triangle to be rendered and the tile being processed can be used to define the half-space regions.

28 Claims, 8 Drawing Sheets

(56) References Cited

U.S. PATENT DOCUMENTS

| | | | |
|---|---|---|---|
| 7,023,437 B1 * | 4/2006 | Voorhies et al. | 345/420 |
| 7,286,137 B2 | 10/2007 | Baba-Ali | |
| 7,812,837 B2 | 10/2010 | Naoi | |
| 7,948,487 B2 | 5/2011 | Naoi | |
| 8,009,269 B2 | 8/2011 | Troost | |
| 8,284,206 B2 * | 10/2012 | State et al. | 345/505 |
| 8,854,364 B1 * | 10/2014 | Voorhies | 345/421 |
| 2008/0068375 A1 | 3/2008 | Min et al. | |
| 2012/0274636 A1 * | 11/2012 | Akenine-Moller et al. | 345/420 |
| 2013/0287314 A1 * | 10/2013 | Toth et al. | 382/275 |

OTHER PUBLICATIONS

Republic of China (Taiwan) Search Report (English translation) issued in corresponding Taiwanese application No. 101122486 dated Jun. 20, 2014 (1 page).

* cited by examiner

STOCHASTIC RASTERIZATION WITH SELECTIVE CULLING

This application is a 371 of PCT/US2011/061726 Nov. 21, 2011, which claims benefit of 61/500,189 Jun. 23, 2011.

BACKGROUND

This relates to computers and, particularly, to graphics processing. During the last few years, research activity has increased on stochastic rasterization. Efficient rasterization of depth of field (DOF) and motion blur at the same time remains an elusive goal. Rasterization of only depth of field is a substantially simpler problem, but still, specialized algorithms for this are not well explored.

DETAILED DESCRIPTION

An efficient algorithm for rasterization of depth of field is based on removing half-space regions of the (u, v)-space on the lens from where the triangle to be rendered definitely cannot be seen through any pixel within a tile. We find the intersection of all such regions exactly, and the resulting region is used to reduce the number of samples in a tile where the full "sample-inside-triangle" test needs to be performed. We present several efficient methods on how to use the resulting region in (u, v)-space to quickly cull samples from being tested.

As usual for depth of field (DOF) rendering, the lens area is parameterized by (u, v) $\in \Omega \subseteq [0,1] \times [0,1]$, where $\Omega$ is the aperture shape and may, for instance, be square or circular. In general, we have n samples per pixel for stochastic rasterization, where each sample consists of a spatial position, $(x_i, y_i)$, and a lens position, $(u_i, v_i)$. A clip-space vertex of a triangle is denoted $p^i = (p_x^i, p_y^i, p_z^i, p_w^i)$, and a triangle is then $p^0 p^1 p^2$. A tile is a rectangular block of pixels in the plane in focus. Sometimes, we use the term "focus plane" instead of "plane in focus," which is the plane with w=F where rendered geometry will appear in perfect focus. An inside test simply computes whether a certain sample, $(x_i, y_i, u_i, v_i)$, is inside the triangle being rasterized. In general, the number of unnecessary inside tests should be minimized.

In order to describe our algorithm, we will use the notion of separating planes, which has been used for cell-based occlusion culling for large occluders. A separating plane between two convex polyhedral objects is a plane formed by an edge from one object and a vertex from the other object, and at the same time, the objects must lie on opposite sides of the plane. An illustration of this is shown in FIG. 1 in two dimensions.

Figure 1:
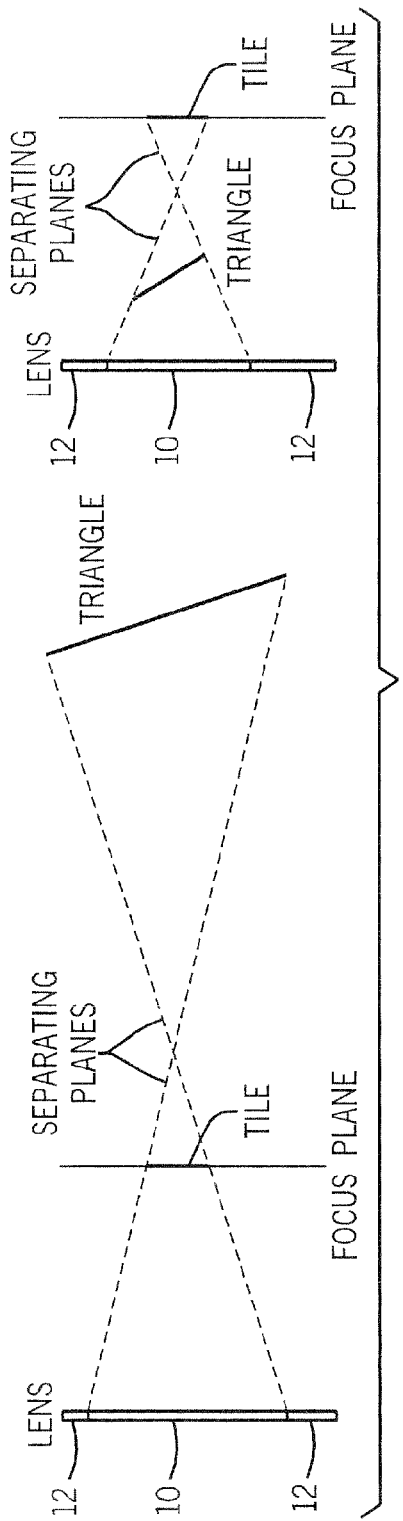
FIG. 1 is a sketch showing a separating plane in two dimensions, according to one embodiment.

In FIG. 1, the separating lines of a tile and a triangle can be used to find regions on the lens where we can reduce the number of computations needed for stochastic rasterization. The regions 10 and 12 on the lens are detected using the separating planes. Note that in the regions 12, there are no lens positions that can "see" the triangle through any point in the tile. On the left in FIG. 1, a triangle is behind the focus plane. On the right in FIG. 1, a triangle is in front of the focus plane. When a vertex behind the focus plane is used to define the separating plane, the positive half-space contains the tile, and vice versa.

Separating planes, derived from a tile and a triangle, may be used to remove half-space regions on the lens from further processing. We find regions on the lens which cannot "see" the triangle through any point in the tile, and hence all samples in the tile with lens coordinates, $(u_i, v_i)$, in such regions do not need any further inside-testing. Intuitively, this can be understood from FIG. 1, where the separating lines of the tile and the triangle are used to cull regions 12 on the lens.

Figure 2:
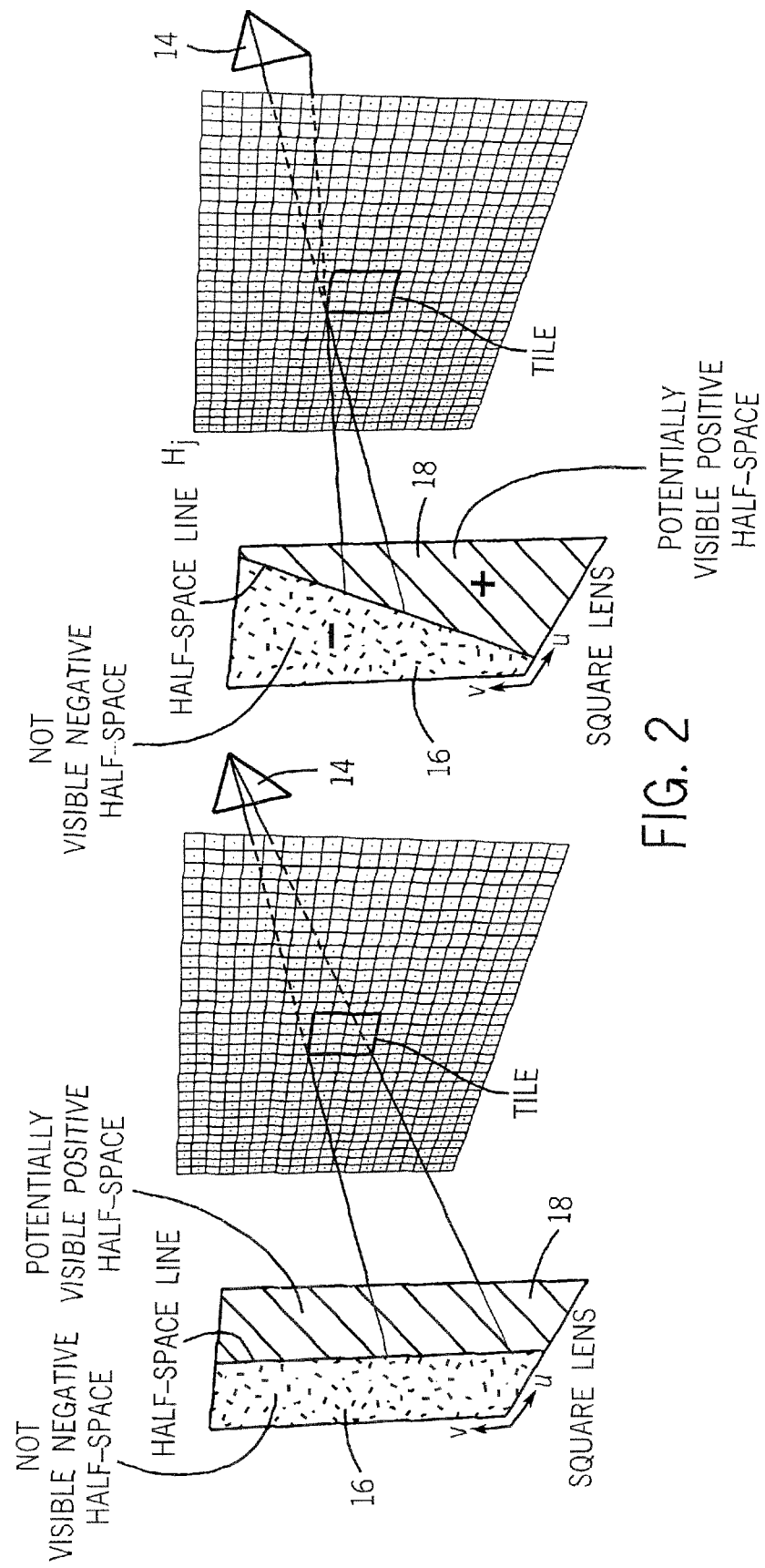
FIG. 2 is a schematic depiction of potentially visible and not visible half-spaces, according to one embodiment.

In three dimensions, there are two different types of separating planes that can be used to cull half-space regions on the lens. These are illustrated in FIG. 2. The first set of separating planes are generated by a tile edge and a triangle vertex. Let us denote these planes by $\pi_i$, where the positive half-space of the plane consists of all points, p, such that $\pi_i(p) \geq 0$. Now, consider the leftmost (vertical) edge of the tile. In the example to the left in FIG. 2, the tile's left side creates a separating plane with the rightmost triangle vertex. This separating plane cuts the lens area into two half-spaces. We call the dividing line a half-space line, $h_i(u, v) = 0$.

In FIG. 2, on the left, in this example, the rightmost vertex of the triangle 14 forms a separating plane with the leftmost tile edge. This plane intersects the lens area, and divides it into two half-spaces: the negative half-space 16, whose points on the lens cannot see the triangle through any point in the tile, and the positive half-space 18, whose points on the lens potentially can see the triangle. The normal of the separating plane is on the same side of the plane as the tile itself, and this defines the positive and negative half-space on the lens. On the right in FIG. 2, a separating plane is formed from a triangle edge and a tile corner.

Note that we choose the "sign" of the normal (i.e., +n or −n) of the separating plane differently depending on whether the triangle vertex, forming the separating plane, is in front or behind the focus plane. The rationale for this is that we would like to cull regions where $h_i(u, v) < 0$, independent of vertex position. For vertices behind the focus plane, the separating plane's normal is chosen such that its positive half space contains the entire tile. In contrast, for vertices in front of the focus plane, the separating plane's normal is such that its negative half-space contains the entire tile. This is illustrated in FIG. 1.

The direction of the two-dimensional normal of the half-space line is inherited from the corresponding separating plane's normal. These two-dimensional normals are illustrated as arrows in FIG. 2. Geometrically, it is easy to see that no point in the negative half-space on the lens can "see" the triangle through any point in the tile.

The second set of half-space lines are generated from separating planes formed from a triangle edge and a tile corner. An example is illustrated to the right in FIG. 2. We denote these by $\Pi_j$ to distinguish them from the planes ($\pi_i$) formed by tile edges and triangle vertices. The $\Pi_j$ planes also generate half-space lines, which are denoted $H_j(u, v)=0$.

The first set of half-space lines, $h_i$, will be either horizontal or vertical, and in general, the second set of half-space lines, $H_j$, can have arbitrary orientation. When all tile edges each generate one separating plane, they will form a two-dimensional box in the plane of the lens. With such a box, it is simple and efficient to cull large portions of the samples in the entire tile from further processing. An example is shown to the left in FIG. 3. To the right in the same figure, further regions on the lens have been culled away by the $H_j$ planes. When all triangle vertices either are in front of or behind the focus plane, the remaining active region on the lens is defined by a convex region, where $h_i(u, v) \geq 0$ and $H_j(u, v) \geq 0$. Only the samples with their lens coordinates, $(u_i, v_i)$, inside this active region (region 20 in FIG. 3), need to be inside-tested. The efficiency of our practical algorithms, described later, stems from this fact.

Figure 3:
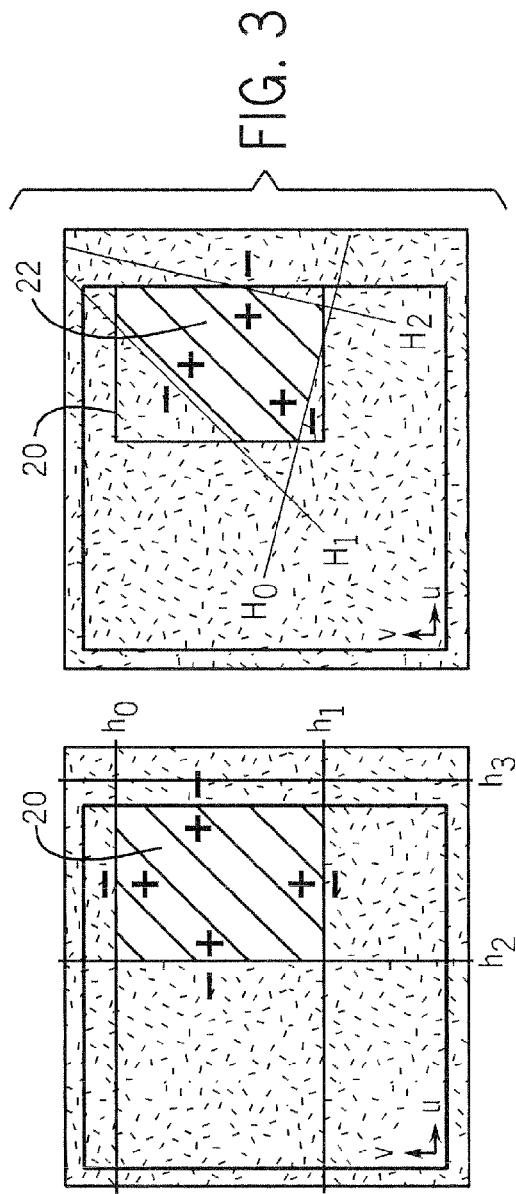
FIG. 3 is a depiction of how separating planes generate half-space lines, according to one embodiment.

In FIG. 3, the lens is the thick-lined square. On the left, the first four separating planes generate horizontal and vertical half-space lines, which are defined by $h_i(u, v)=0$. Together, they form a two-dimensional bounding box in the lens plane. Only the samples with lens positions in the region 20 need to be further processed. Using only the first four planes can cull away a substantial region of the lens. On the right in FIG. 3, the second set of half-space lines, $H_j(u, v)=0$ can further reduce the region 20. When the triangle is crossing the focus plane, the situation is more complex and we will show hereinafter how to use the first set of half-space lines, $h_i(u, v)$, for culling in such cases.

It is not always possible to create separating planes. For example, when the triangle cuts through a tile, it will not be possible to find separating planes for that tile. However, this occurs when the triangle goes from front- to backfacing or vice versa, and hence, it is possible to add a half-space line to cut away parts of the lens where the triangle is backfacing. This could be beneficial for triangles close to the silhouette of the object. In practice, there is usually a small number of such triangles compared to the rest of the triangles in a scene, and as a consequence, we have not found that this pays off.

We will use an abundant notation in order to simplify the description of the algorithm. As before, the triangle vertices are called $p^0$, $p^1$, and $p^2$. The four corners of a tile are denoted by $t^a$, $t^b$, $t^c$, and $t^d$. The projection of a vertex, $p^j$, through a tile corner, $t^i$, onto the lens will be denoted by $l^{ij}=(l_u^{ij}, l_v^{ij})$.

Figure 4:
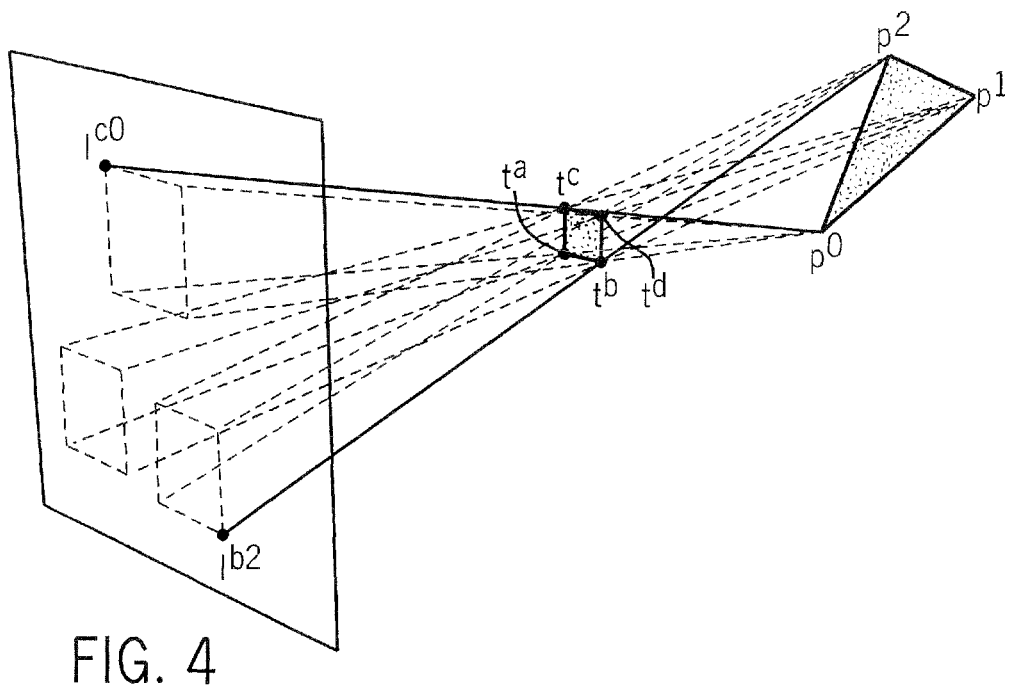
FIG. 4 is a schematic depiction of a triangle projected through tile corners according to one embodiment.

Referring to FIG. 4, showing an illustration of our notation, the vertices, $p^0$, $p^1$, and $p^2$, of a triangle are projected through the tile corners, $t^a$, $t^b$, $t^c$, and $t^d$, onto the lens to form the lens coordinates, $l^{ij}$, where $i \in \{a, b, c, d\}$, and $j \in \{0,1,2\}$. For example, the vertex $p^2$ is projected through $t^b$ to generate $l^{b2}$.

The projection of a vertex, $p^j$, through a tile corner, $t^i$, gives the lens coordinates of $l^{ij}$:

$$l_u^{ij} = -\frac{p_x^j F}{p_w^j - F} + t_x^i \frac{p_w^j}{p_w^j - F} = o_u^j + t_x^i \delta^j, \quad (1)$$

$$l_v^{ij} = -\frac{p_y^j F}{p_w^j - F} + t_y^i \frac{p_w^j}{p_w^j - F} = o_v^j + t_y^i \delta^j.$$

The offsets, $o$, and the deltas, $\delta$, are constant when rendering a particular triangle, and these can therefore be computed in a triangle setup. In addition, there is only a linear dependence on the tile coordinates, $(t_x^i, t_y^i)$, implying that they can be evaluated efficiently using incremental updates when moving from one tile to the next. If $p_w^j - F=0$, then that coordinate will never generate a half-space on the lens that will actually cull anything. The reason is that the projections, $(l_u^{ij}, l_v^{ij})$, will approach $\pm\infty$, which will never help in culling on a finite lens. Hence, such vertices may be ignored for the remainder of the computations.

Next, we describe how the separating planes, $\pi$, through a tile edge and a triangle vertex are found. The most straightforward way to determine whether a plane is separating, is to test whether the two triangle vertices, which were not used to define the plane, are on the opposite side of the plane compared to the tile. We will describe one efficient way of doing this.

Since these half-space lines, $h(u, v)=0$, will be either horizontal or vertical, all computations can be done in two dimensions. Let us assume that we want to determine whether a plane from one of the triangle vertices, $p^j$, is a separating plane through a tile edge located at $x=t_z^i$. In this case, all calculations can be done entirely in the xw-plane. In the following, recall that the focus plane is at $w=F$, and the lens is at $w=0$. Note also that in all our illustrations, the pixels are located exactly in the focus plane.

To determine whether $u=l_u^{ij}$ actually defines a half-space line from a separating plane, we want to determine in which half-space the other two triangle vertices are located. If they both are not in the same half-space as the tile itself, we have found a separating line, $u=l_u^{ij}$.

To test if $u=l_u^{ij}$ is a separating plane, we set $q=p^j$ and let $r$ be one of the other triangle vertices. We derive a two-dimensional line equation from $(q_x, q_w)$ to $(t_x^i, F)$, and insert the two other triangle vertices into the line equation. After a bit of mathematical manipulation, we find that the line equation evaluation at a point $(r_x, r_w)$ is:

$$e(q, r) = r_x(q_w - F) + q_x(F - r_w) + t_x^i(r_w - q_w) = O_{qr} + t_x^i \Delta_{qr}. \quad (2)$$

Note also that $e(q,r)=-e(r, q)$, so for a given tile, only $e(p^0, p^1)$, $e(p^1, p^2)$, and $e(p^2, p^0)$ need to be evaluated. In general, for $u = l_u^{ij}$ to define a separating line, the two other triangle vertices should be on the same side of the line, and be in the negative half-space when $p_w^j > F$, and in the positive half-space when $p_w^j < F$, as can be seen in FIG. 1. The case when $p_w^j - F=0$ is ignored, as described previously, because such projections will not provide any culling. Note that Equation 2 is linear in $t_x^i$, which is to be expected since $l_u^{ij}$ is linear.

For example, given the vertex $q=p^0$, and the left-most tile edge, $x=t_x^a$, we test if $u=l_u^{a0}$ is a separating half space-line by evaluating the line equation (Equation 2) for $r=p^1$ and $r=p^2$. If it is separating, the corresponding half-space line, $h(u, v)$, is defined by:

$$h(u, v) = \begin{cases} u - l_u^{a0}, & \text{when } p_w^0 > F, \\ l_u^{a0} - u, & \text{when } p_w^0 < F, \end{cases} \quad (3)$$

which is a vertical half-space line on the lens. Note that the culling "direction" changes depending on whether the vertex is in front of the focus plane, F, or behind it. In addition, the $p_w > F$ tests are reversed when testing against the right-most tile edge, $x=t_x^d$. Similar equations are created for all lens coordinates, $l_u^{ij}$ and $l_v^{ij}$ that have been verified to be real separating planes (using Equation 2). This is all that is needed for computing the horizontal and vertical half-space lines, $h_i(u, v)=0$.

Finally, we describe how we handle cases where at least one vertex is located in front of the focus plane, and at least one behind the focus plane.

Figure 6:
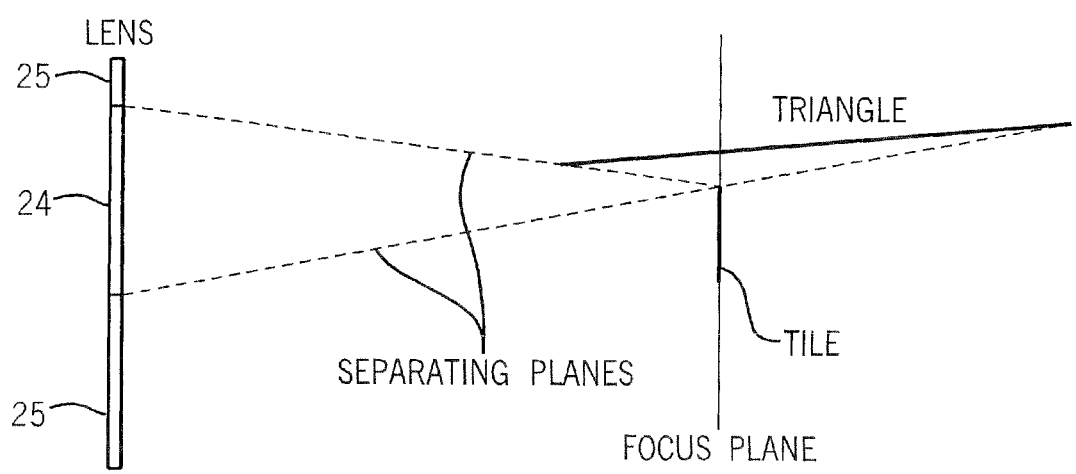
FIG. 6 is a depiction of a triangle intersecting a focus plane, according to one embodiment.

In FIG. 6, when a triangle intersects focus plane, a tile side can generate two separating planes. Note that culling is done in the "inner" region 24 in this case, in contrast to when the triangle does not intersect the focus plane (see FIG. 1). In this case, we generate one uv-box for the topmost region 25 and one for the bottommost region on the lens.

The set of triangle vertices behind focus plane is denoted A, and the set in front of the focus plane is denoted B. When one set is empty, all vertices are located on one side of the focus plane. In these cases, it is straightforward to generate a box in the uv domain on the lens, and inside-testing will only be done inside the box. We call these uv-boxes, where we use the term box broadly because they can extend infinitely in some directions as we will see. When both A and B are non-empty, and there are separating half-space lines generated from both sets, two uv-boxes will be generated. This can be seen in FIG. 6. When there are two separating half-space lines generated in one set (e.g., A), both these will be used to define that set's uv-box.

Figure 5:
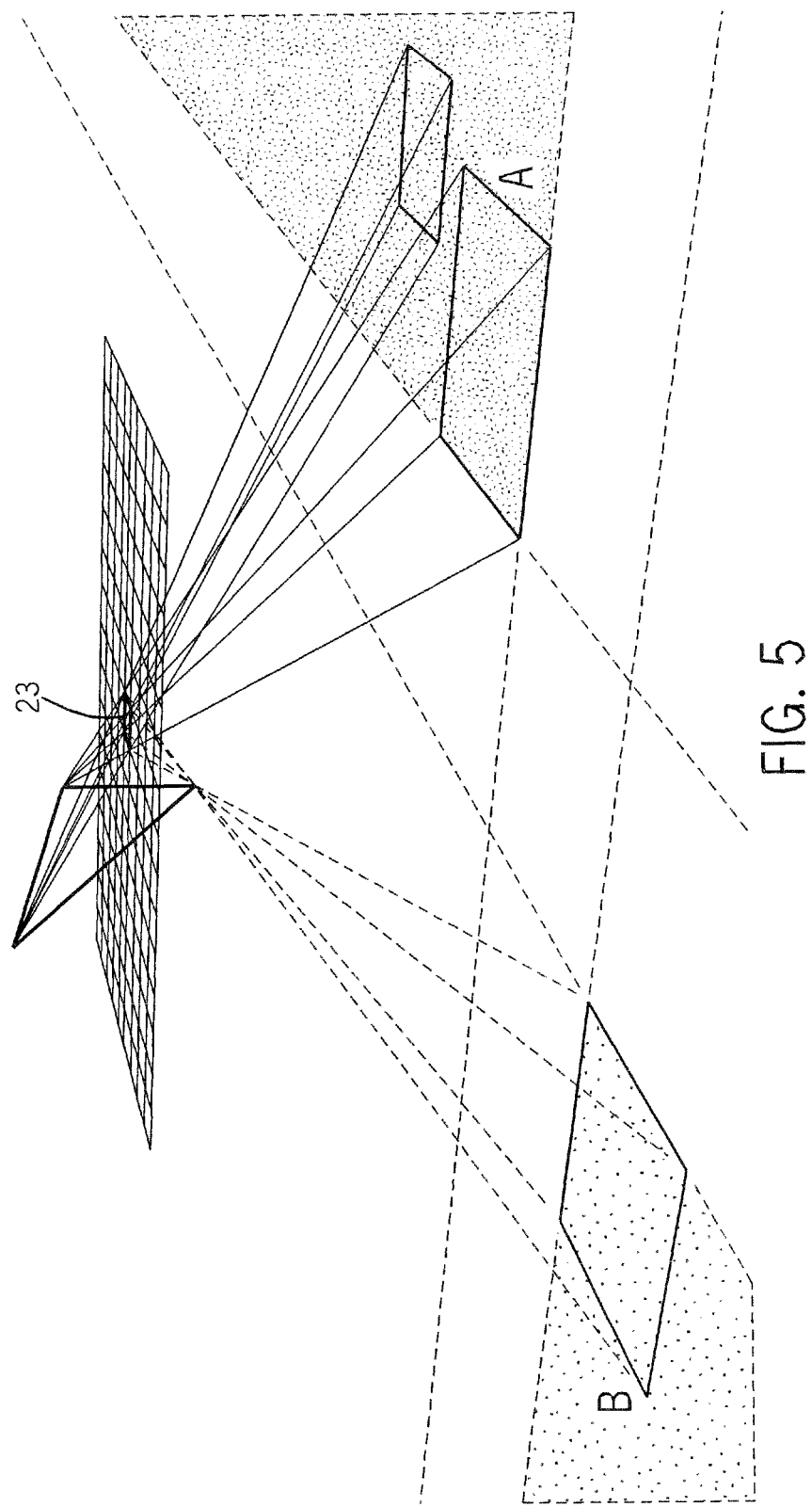
FIG. 5 is a sketch showing visible regions for a triangle seen through a tile in accordance with one embodiment.

This is illustrated in FIG. 5. Visible regions for the triangle seen through the tile 23. In this case, we generate two uv-boxes on the lens, and inside testing is only done for samples with uv-coordinates inside these regions.

After computing $l^{ij}$, the classification of planes can be performed in a different way that requires less live data and is potentially more amenable to parallelization. The algorithm below is only described for the u dimension; the same procedure is valid for the v dimension.

We start by classifying the triangle vertices depending on which side of the focus plane they are. Using the notation from FIG. 4, we then form the two intervals:

$$\hat{A} = [\underline{A}, \overline{A}] = \left[\min_{i,j} l_u^{ij}, \max_{i,j} l_u^{ij}\right] \quad \forall\, i, j : i \in \{a, d\},\, p_w^j > F, \quad (4)$$

$$\hat{B} = [\underline{B}, \overline{B}] = \left[\min_{i,j} l_u^{ij}, \max_{i,j} l_u^{ij}\right] \quad \forall\, i, j : i \in \{a, d\},\, p_w^j < F.$$

If $p_w^j > 0$, Equation 4 can be simplified, and we only need to test one of the two tile corners for each interval limit. If all triangle vertices are on one side of the focus plane, one of the intervals is empty, and the visible interval in u is given by $\hat{A}$ or $\hat{B}$. If $\hat{A} \cap \hat{B} \neq \emptyset$, no separating plane exists between a vertical tile edge and a triangle corner.

Finally, if $\hat{A} \neq \emptyset$, $\hat{B} \neq \emptyset$ and $\hat{A} \cap \hat{B} = \emptyset$, we get the visible intervals:

$[-\infty, \overline{A}], [\underline{B}, \infty]$ if $\hat{A} < \hat{B}$, $[-\infty, \overline{B}], [\underline{A}, \infty]$ if $\hat{B} < \hat{A}$. (5)

The intervals for the v dimension are computed similarly. To derive the visible 2D regions on the lens, the intervals including A borders for u and v are combined to form a 2D region. Similarly for the intervals including B borders. For example, if we get the case described in Equation 5 in both u and v, with $\hat{A}_u > \hat{B}_u$ and $\hat{A}_v > \hat{B}_v$, the resulting uv-boxes are:

uv-box A: $[\underline{A}_u, \infty] \times [\underline{A}_v, \infty]$ (6)

uv-box B: $[-\infty, \overline{B}_u] \times [-\infty, \overline{B}_v]$. (7)

This case is illustrated in FIG. 5.

The algorithm described so far is correct as long as no vertex lies exactly in the focus plane. A few minor adjustments need to be performed on the calculated regions whenever such vertices exist:

$\overline{A}_u = \infty$, $\underline{B}_u = -\infty$, if $p_x^j \leq t_x^d$ for any $p^j$ with $p_w^j = 0$, $\underline{A}_u = -\infty$, $\overline{B}_u = \infty$, if $p_x^j \geq t_x^a$ for any $p^j$ with $p_w^j = 0$, (8)

and similarly for v.

Next, we describe how the $H_j$ lines are computed.

Figure 7:
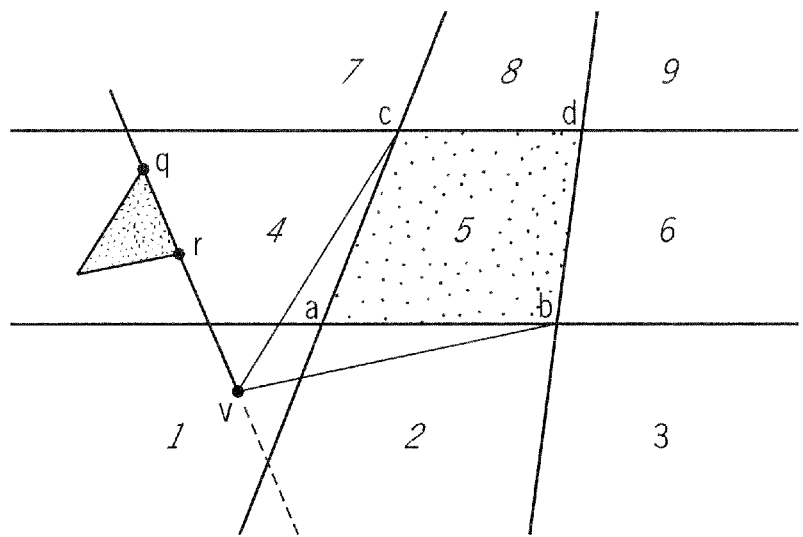
FIG. 7 is a sketch showing a triangle edge qr as an intersection tested against the focus plane which generates the intersection point v in accordance with one embodiment.

Given a triangle edge qr, we form the ray $q+t(r-q)=q+td$. Referring to FIG. 7, we compute the intersection point, v, between the ray and the focus plane. We divide the focus plane into nine regions and identify which region v falls into. The intersection point, v, does not depend on the tile for which we wish to categorize the edge. It is therefore possible to pre-compute this point and at which tile the cell changes. The only work needed per tile is thus a comparison of the tile coordinate with these pre-computed boundaries.

With v categorized into one of the nine cells, we identify the two tile corners m and n which form the largest angle $\angle t^m v t^n$. These can be tabulated as follows:

|   | Cell |   |   |   |   |   |   |   |   |
|---|---|---|---|---|---|---|---|---|---|
|   | 1 | 2 | 3 | 4 | 5 | 6 | 7 | 8 | 9 |
| m | b | b | d | a | — | d | a | c | c |
| n | c | a | a | c | — | b | d | d | b |

Using this table, we can form two candidate planes $\Pi_1$: (q, r, $t^m$) and $\Pi_2$: (r, q, $t^n$). Using the sign of the $d_w$-component, i.e., whether the edge, qr, points towards the camera, we can choose plane normal directions such that the tile is in the negative halfspace of the respective plane. For edges parallel to the image plane, $d_w=0$, and we use $d_x$, $d_y$ to determine m and n and the sign of $q_w-F$ to determine the normal direction. There are no candidate planes for cell five, since in this cell, the edge is pointing straight at the tile and there cannot exist any separating planes between the edge and a tile corner. Likewise, any edge qr where $q_w=r_w=F$, cannot produce a useful half-space line and is thus ignored.

In FIG. 7, the triangle edge qr is intersection tested against the focus plane, which generates the intersection point, v. The tile abcd divides the focus plane into nine regions, numbered 1-9. In the example above, the intersection point, v, lies in cell 1, and therefore the candidate corners to form separating planes are b and c. In this illustration, those are shown as lines, from v to c and from v to b which form tangents between v and the tile.

To determine if $\Pi_1$ and $\Pi_2$ are separating planes, the third vertex of the triangle is tested against these planes. If the vertex is in the positive half-space of a plane, that plane is a separating plane. Each triangle edge can generate up to two separating planes, as can be seen in FIG. 8.

Figure 8:
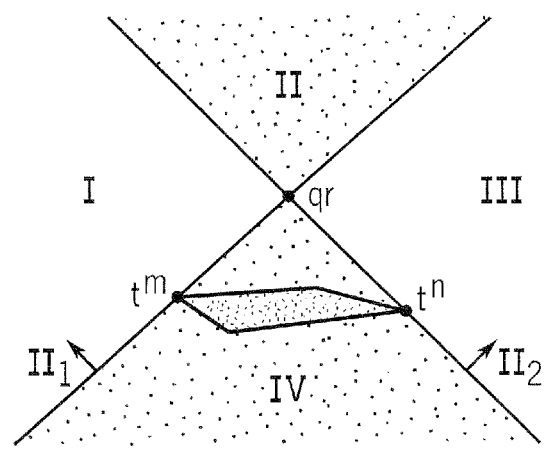
FIG. 8 is a sketch showing two candidate planes dividing space into four regions in accordance with one embodiment.

In FIG. 8, the two candidate planes, $\Pi_1$ and $\Pi_2$, divide space into four regions, shown as I-IV. By construction, the triangle edge qr is included in both these planes. Whether $\Pi_1$ and $\Pi_2$ are separating depends on which region the third triangle vertex, s, is in. If s is in region I or II, $\Pi_1$ is a separating plane. $\Pi_2$ is separating if s lies in region II or III. A triangle edge qr can thus produce zero, one, or two separating planes.

Given a plane $\Pi$: $n \cdot x + c = 0$, the corresponding half space line on the lens (u, v, 0) is $n \cdot (u, v, 0) + c = n_x u + n_y v + c$. (9)

This equation varies non-linearly and must therefore be computed for each tile. To see this, consider again the triangle edge qr and a tile corner t in the focus plane. A plane through these points is defined by $\mathbb{P} : n \cdot x + c = 0$, where:

$$n = q \times r + (r-q) \times t$$

$$c = -t \cdot (q \times r) \tag{10}$$

Note that the normal n and c change as we move in screen space. The change is proportional to the difference in depth of q and r.

Finally, the normals of the planes $\Pi_i$ need to be handled carefully when culling samples on the lens. When culling regions from uv-box A, samples in the positive half-space of $\Pi_i$ can be culled. However, when culling regions from uv-box B, samples from the negative half-space of $\Pi_i$ can be culled.

Up until now, the half-space lines, $h_i$ and $H_j$, which lie in the plane of the lens, have been computed in an exact manner. In this subsection, we will describe how they can be exploited to quickly cull samples for faster depth of field rasterization. The half-space lines are computed on a per-tile basis, and hence culling opportunities will be shared between all the pixels in a tile. However, the process still needs to be very efficient if we are to see performance gains. As will be seen, determining which samples lie within the active subspace of the lens is essentially a rasterization process in itself.

Figure 9:
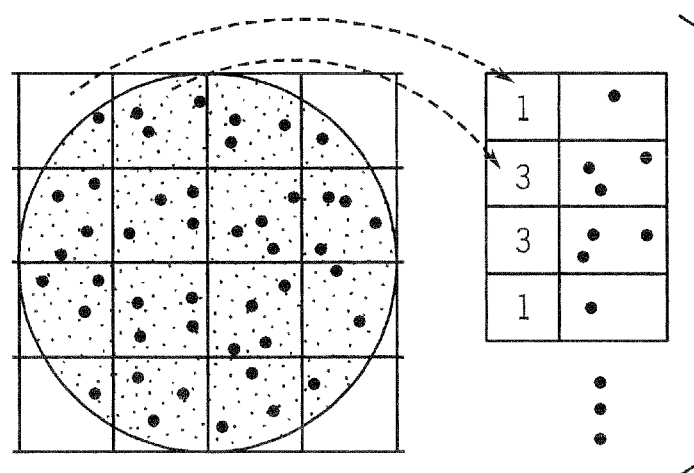
FIG. 9 is a sketch of a lens grid with corresponding storage.

We superimpose a square grid on top of the lens shape and keep track of the number of samples falling into each grid cell. This is illustrated in FIG. 9. These sample distributions vary from pixel to pixel, and we use a small set (32×32) of distributions that are scrambled and repeated over the screen. Note that 32×32 can be replaced with a resolution of the implementor's choice.

FIG. 9 shows a lens grid with corresponding storage. For each grid cell, we store the number of samples within that cell, and an offset pointing to the first sample in that grid cell. With this layout, we can efficiently cull large sets of samples against the separating half-space lines.

The half-space lines, $h_i$, which are generated from triangle vertices and tile edges, provide an easy means of culling since they are axis aligned. We can simply clamp them down and up to the nearest grid cell and use the clamped rectangular extents to quickly traverse relevant samples.

For the non-axis aligned half-space lines, $H_j$, we iterate over all grid cells in the rectangular extents computed from the $h_i$ lines and conservatively test for overlap betweem the grid cells and the $H_j$ lines. This essentially boils down to a micro-rasterization process for every screen-space tile in order to cull the samples. A way to optimize this is to exploit the limited resolution of the lens grid and use a pre-computed rasterizer. The idea here is to have a small lookup-table, where inside bitmasks are precomputed and stored for different orientations of edges (e.g., a 64-bit mask table is sufficient for an 8×8 grid). All edges are queried in the table, and the inside region is computed by doing AND-operations on the bitmasks.

In the following pseudo-code, we outline the full algorithm for rendering depth of field using half-space line culling.

```
compute BBox of defocused triangle Δ
compute initial h₀, ..., h₃ half-space lines
for all tiles T in BBox do
    inexpensive update of h₀, ..., h₃
    compute UVBoxes from h₀, ..., h₃
    if any UVBox overlaps lens shape then
        compute Hⱼ half lines
        bitmask = compute overlap bitmask for all Hⱼ
        for all pixels p in T do
            for all grid cells C in UVBoxes do
                if bitmask[C] == True then
                    test samples in C(p) against Δ
                end if
            end for
            shade pixel (multisampling)
        end for
    end if
end for
```

Figure 10:
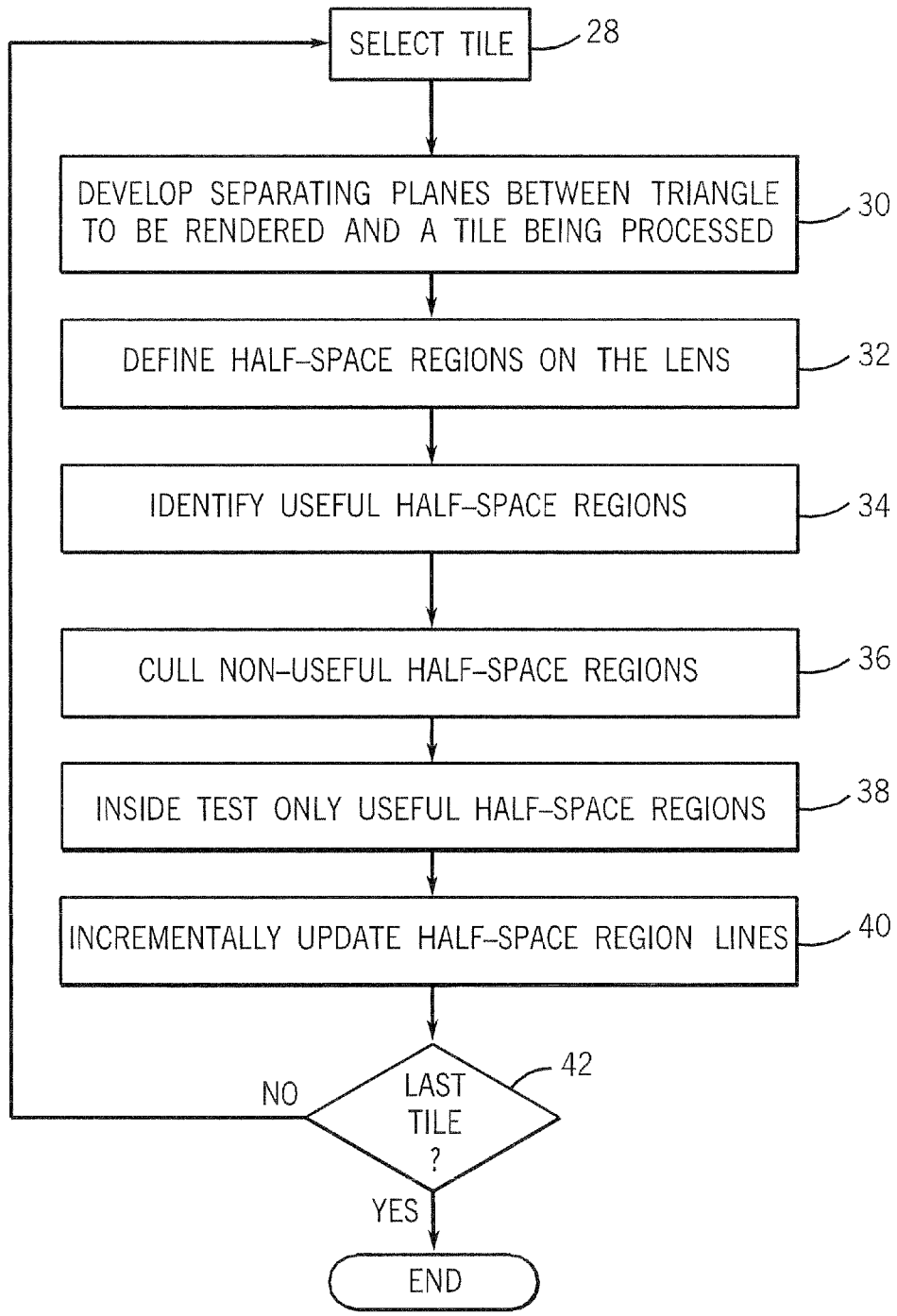
FIG. 10 is a flow chart for one embodiment.

According to one embodiment, a high-level depth of field rasterization algorithm is shown in FIG. 10. The sequence shown in FIG. 10 may be implemented in software, hardware, and/or firmware. In a software embodiment, the sequence may be implemented by computer readable instructions stored on a non-transitory computer readable medium, such as an optical, semiconductor, or magnetic storage device.

Initially, a tile is selected (block 28) and the separating planes are developed between a triangle to be rendered and the tile being processed, as indicated in block 30. Next, half-space regions on the lens are defined using the separating planes, as indicated in block 32. Then, the useful half-space regions are identified, as indicated in block 34. The useful half-space regions are those regions on the lens from which a triangle to be rendered is visible. The non-useful half-space regions are culled, as indicated in block 36, and are not further processed. As indicated in block 38, only the useful half-space regions are inside tested. In block 40, the half-space region lines are incrementally updated. A check at diamond 42 determines whether this is the last tile. If so, the flow ends and, otherwise, the flow iterates back to block 28 to select another tile to process.

An oracle function decides when a certain part of the culling computations will have efficiency so low that the culling cost exceeds the cost of what is culled in one embodiment. When the oracle function determines these computations are inefficient, they are disabled. In terms of depth of field, this occurs when the projected triangle size is small in relation to the distance to the focus plane, i.e., when a triangle gets very blurry in screen space. Since this can be expected to happen a lot for depth of field rendering, the oracle function can provide significant gains in one embodiment. In general, a tile test determines whether the triangle to be rendered overlaps with a tile. However, a tile test may also provide additional information. For example, if a triangle overlaps the tile, the test may provide information about which samples need to be inside-tested, and which samples need no further processing. For depth of field, processing of samples located on the lens can be avoided, and for motion blur, processing of time samples can be avoided. The combination is also possible.

The tile test for depth of field consists of computing two sets of separating planes between the tile and a triangle. The first set of planes, aligned to tile edges, is always beneficial to compute. The set of planes aligned to triangle edges are more expensive to compute and are primarily useful when the defocus is large in comparison to the length of the triangle edge to which the plane is aligned. It is these latter planes that are evaluated and adaptively disabled based on the oracle function. The computation of the latter planes is henceforth called tile edge test.

The oracle works as follows. The cost of performing the tile edge test for an edge is denoted $C_{test\_enabled}$. The cost of not performing the tile edge test for an edge is denoted $C_{test\_disabled}$ (which is the cost of executing all sample tests within the tile that could potentially be avoided by the tile edge test). If $C_{test\_enabled} > C_{test\_disabled}$, then the tile edge test for the evaluated edge is disabled for the current triangle. The cost $C_{test\_enabled}$ of culling for one edge over all tiles in the bounding box of the defocused triangle is computed as $$C_{test\_enabled} = \frac{A_{total}}{A_{tile}} \cdot C_{tile\_edge\_test},$$

where $A_{total}$ is the screen area of the bounding box of the defocused triangle, $A_{tile}$ is the area of a single tile, and $C_{tile\_edge\_test}$ is the cost of computing one tile edge test. $C_{test\_disabled}$ is computed as $$C_{test\_disabled} = A_{cull} \cdot C_{sample\_test} \cdot R,$$

where $A_{cull}$ is the density weighted screen area that can be culled by the edge, $C_{sample\_test}$ is the cost of testing one sample, and R is the multi-sample rate. Note that $C_{sample\_test} \cdot R$ can be pre-computed when the multi-sample rate changes, or even be tabulated since R is typically one of only a few values.

Figure 12:
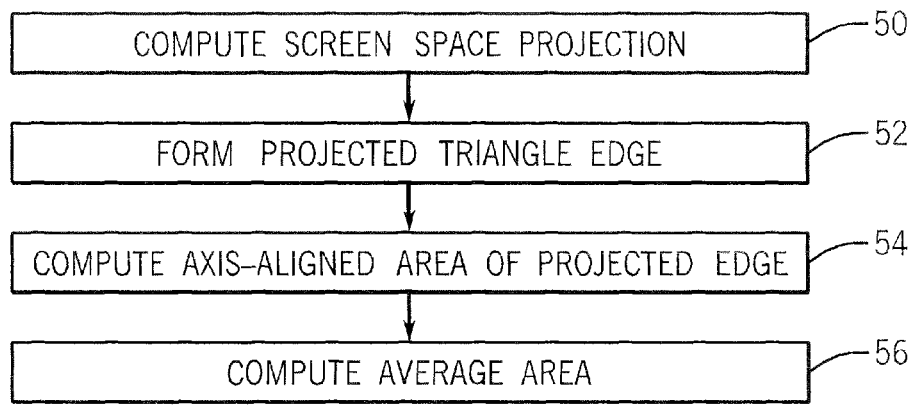
FIG. 12 is a flow chart for another embodiment.

An estimate of the screen surface area $A_{cull}$ that can be culled by a tile edge test for a given edge is computed in the triangle setup as set forth in FIG. 12, according to one embodiment.

The screen space projection $(X_i, Y_i)$ of each triangle vertex i is computed (block 50) as a function of the lens coordinates (u,v) in the lens $\Omega$:u×v :[−1, 1]×[−1, 1]. Depth-of-field is a shear in clip space and the projections can be written:

$$X_i(u) = x_i^c + ku$$

$$Y_i(v) = y_i^c + mv$$

where $x_i^c$ and $y_i^c$ are the screen space projection at the center of the lens, and k and m are per-vertex constants depending on the shear matrix elements and the z and w component of the triangle vertex.

The projected triangle edge $\Delta(u,v) = (X_1 - X_0, Y_1 - Y_0)$ is formed (block 52).

The axis-aligned area of the projected edge: $A_{bb}(u, v) = |\Delta_x(u)||\Delta_y(v)|$ is computed (block 54).

The average area that can be culled from this edge is computed (block 56) by integrating half the axis-aligned area over the lens $\Omega$:

$$A_{avg} = \frac{1}{2A_\Omega} \int_\Omega A_{bb}(u, v) d\Omega,$$

where $A_\Omega$ is the area of the lens. In order to compute the integral, which contains an abs-operation, $A_{bb}$ is separated into (up to four) $C^l$ continuous pieces. This is easily done by solving the linear equations $\Delta_x(u)=0, \Delta_x(v)=0$, for (u, v). Use the resulting area as $A_{cull}$.

To get correctly weighted costs $C_{test\_disabled}$ and $C_{test\_enabled}$, all areas and X and Y may be computed in pixels as opposed to normalized device coordinates. Normalized device coordinates may be used, but require further adjustments to give correct results for aspect ratios other than 1:1. In the common case that no zeros for $\Delta_x(u)=0, \Delta_x(v)=0$, are found for (u,v) inside the lens $\Omega$, and $\Delta_x(u)>0, \Delta_x(v)>0$, the (u) >0, (v)>0, the value of the integral is simply $A_{avg} = \frac{1}{2}|x_1^c - x_0^c||y_1^c - y_0^c|$, which is half the area of the axis-aligned bounding box of the projected edge as seen from the center of the lens. With the special case of no solutions for $\Delta_x(u)=0, \Delta_x(v)=0$, within the lens in mind, we can design a coarser, but slightly faster approximation as: Ahd avg+=½$|x_1^c - x_0^c||y_1^c - y_0^c|$, which avoids the cost of solving for $\Delta_x(u)=0, \Delta_x(v)=0$. This is equivalent to assume that the edge bounding box does not become degenerate for any (u,v) within the lens. Note that the box is degenerate when its area is zero.

The selective culling approach based on estimating the culling potential of half-lines aligned to triangle edges ("tile edge tests") can also be applied to general stochastic rasterization. When computing the integral A_{avg} above, we integrate over the two lens parameter. In the general case, we integrate, not only over the lens, but over all stochastic parameters that affect the screen space position of the triangle edge. For example, in the case of stochastic motion blur rasterization, the integral is over time instead of lens coordinates, and for a stochastic rasterizer with both motion blur and depth of field, the integral is over time and the two lens parameters.

Figure 13:
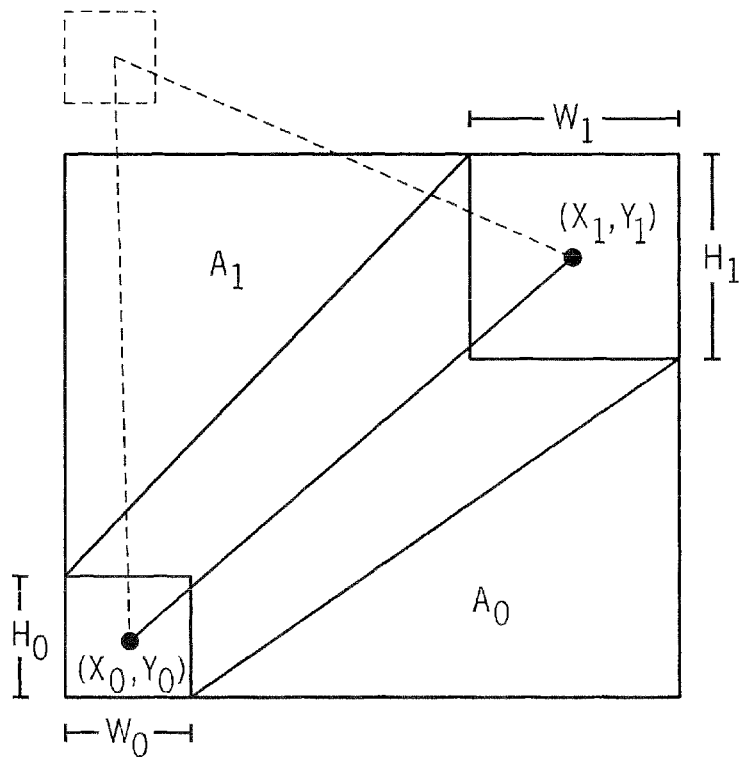
FIG. 13 depicts values used for another embodiment.

An alternative estimate of the screen surface area $A_{cull}$ that can be culled by a tile edge test for a given edge is computed as follows:

$$W = |x_1 - x_0| + \frac{1}{2}(W_0 + W_1)$$

$$H = |y_1 - y_0| + \frac{1}{2}(H_0 + H_1)$$

$$A_0 = \frac{1}{2}(W - W_1)(H - H_0)$$

$$A_1 = \frac{1}{2}(W - W_0)(H - H_1)$$

$$A_{cull} = \max(A_0, A_1)$$

where $(x_0, y_0)$ and $(x_1, y_1)$ are the projected screen space positions of the edge vertices as seen from the center of the lens, $(W_0, H_0)$ and $(W_1, H_1)$ are the circles of confusion of the vertices, as illustrated in FIG. 13.

Figure 11:
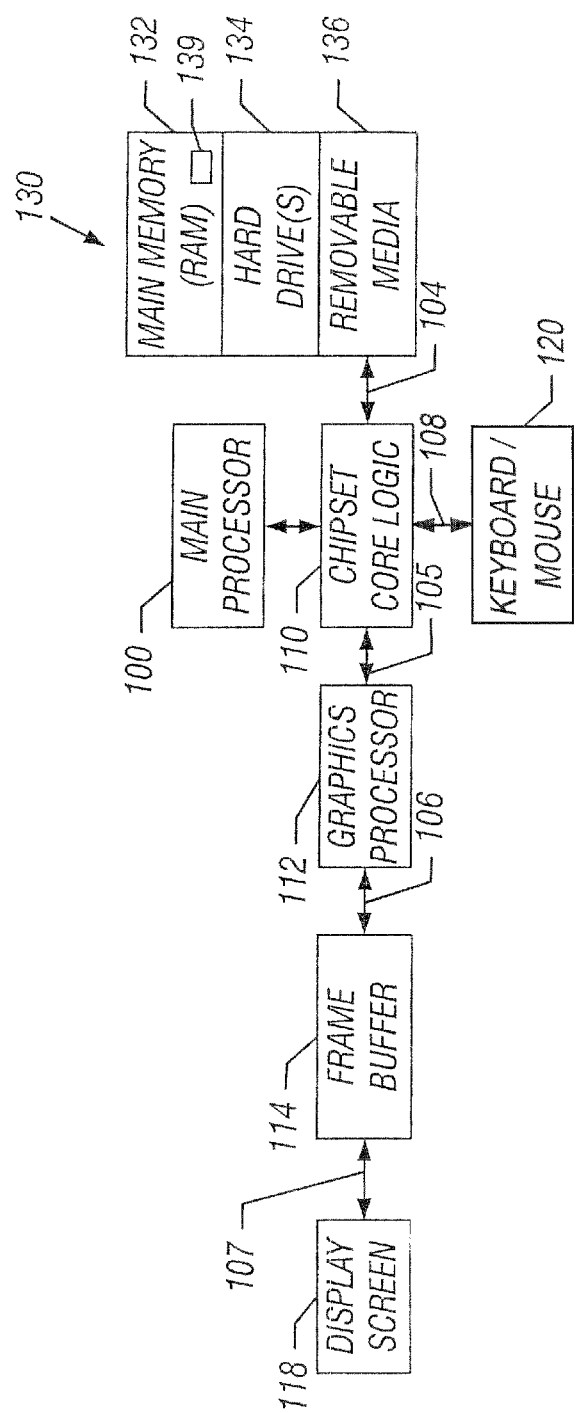
FIG. 11 is a hardware depiction for one embodiment.

The computer system 130, shown in FIG. 11, may include a hard drive 134 and a removable medium 136, coupled by a bus 104 to a chipset core logic 110. The computer system may be any computer system, including a smart mobile device, such as a smart phone, tablet, or a mobile Internet device. A keyboard and mouse 120, or other conventional components, may be coupled to the chipset core logic via bus 108. The core logic may couple to the graphics processor 112, via a bus 105, and the central processor 100 in one embodiment. The graphics processor 112 may also be coupled by a bus 106 to a frame buffer 114. The frame buffer 114 may be coupled by a bus 107 to a display screen 118. In one embodiment, a graphics processor 112 may be a multi-threaded, multi-core parallel processor using single instruction multiple data (SIMD) architecture.

In the case of a software implementation, the pertinent code may be stored in any suitable semiconductor, magnetic, or optical memory, including the main memory 132 (as indicated at 139) or any available memory within the graphics processor. Thus, in one embodiment, the code to perform the sequences of FIGS. 10 and 12 may be stored in a non-transitory machine or computer readable medium, such as the memory 132, and/or the graphics processor 112, and/or the central processor 100 and may be executed by the processor 100 and/or the graphics processor 112 in one embodiment.

FIGS. 10 and 12 are flow charts. In some embodiments, the sequences depicted in these flow charts may be implemented in hardware, software, or firmware. In a software embodiment, a non-transitory computer readable medium, such as a semiconductor memory, a magnetic memory, or an optical memory may be used to store instructions and may be executed by a processor to implement the sequences shown in FIGS. 10 and 12.

A general technique selectively enables a specific culling test for stochastic rasterizers. While an example is given in the context of depth of field rasterization, the technique is applicable to general stochastic rasterization including motion blur and the combination of motion blur and depth of field. Using only motion blur implies a three-dimensional (3D) rasterizer, while using only depth of field implies using a four-dimensional (4D) rasterizer, and using both motion blur and depth of field at the same time implies using a five-dimensional (5D) rasterizer.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method of stochastic rasterization comprising:
   selectively culling, using a computer processor, regions on a lens from which a convex polygon to be rendered is not visible, based on computation cost and generating an image for display by inside testing only samples from regions on the lens that were not culled.

2. The method of claim 1 including performing a tile test for stochastic rasterization by using up to two sets of separating planes between a tile and a triangle, including a first set of planes aligned to tile edges and a second set of planes aligned to triangle edges.

3. The method of claim 2 including evaluating the computation cost of performing cull tests using the second set of planes.

4. The method of claim 3 including evaluating the computation cost of sample testing for samples that can be culled by the second set of planes but not by the first set of planes.

5. The method of claim 4 including performing tile edge testing by determining if a cost of performing culling tests using the second set of planes is greater than sample testing for samples that can be culled by the second set of planes but not by the first set of planes.

6. The method of claim 1 for stochastic depth of field rasterization including estimating a screen surface area that can be culled by a tile edge test for a given edge, computing a screen space projection of a triangle vertex as a function of lens coordinates, computing an area of an axis aligned bounding box containing a projected edge, and computing the average area that can be culled from the projected edge.

7. The method of claim 6, in a general stochastic rasterizer, selectively enabling a culling test based on hyperplanes defined by a triangle edge undergoing a transformation governed by a set of stochastic parameters and a tile corner.

8. The method of claim 7, in a general stochastic rasterizer, selectively enabling a culling test based on hyperplanes defined by a moving triangle edge and a tile corner.

9. The method of claim 8, in a general stochastic rasterizer, selectively enabling a culling test based on hyperplanes defined by a moving and defocused triangle edge and a tile corner.

10. A non-transitory computer readable medium storing instructions to enable a computer to:
    selectively cull regions on a lens from which a convex polygon to be rendered is not visible based on computation cost and generating an image for display by inside testing only samples from regions on the lens that were not culled.

11. The medium of claim 10 further storing instructions to perform a tile test for stochastic rasterization by using up to two sets of separating planes between a tile and a triangle, including a first set of planes aligned to tile edges and a second set of planes aligned to triangle edges.

12. The medium of claim 11 further storing instructions to evaluate the cost of performing cull tests using the second set of planes.

13. The medium of claim 11 further storing instructions to evaluate the cost of sample testing for samples that can be culled by the second set of planes but not by the first set of planes.

14. The medium of claim 13 further storing instructions to perform tile edge testing by determining if a cost of performing culling tests is greater than sample testing for samples that can be culled by the second set of planes but not by the first set of planes.

15. The medium of claim 10 further storing instructions, for stochastic depth of field rasterization, to estimate a screen surface area that can be culled by a tile edge test for a given edge, compute a screen space projection of a triangle vertex as a function of lens coordinates, compute an area of an axis aligned bounding box containing a projected edge, and compute the average area that can be culled from the projected edge.

16. The medium of claim 15 further storing instructions to selectively enable a culling test based on hyperplanes defined by a triangle edge undergoing a transformation governed by a set of stochastic parameters and a tile corner in a general stochastic rasterizer.

17. The medium of claim 16 further storing instructions to selectively enable a culling test based on hyperplanes defined by a moving triangle edge and a tile corner in a general stochastic rasterizer.

18. The medium of claim 17 further storing instructions to selectively enable a culling test based on hyperplanes defined by a moving and defocused triangle edge and a tile corner in a general stochastic rasterizer.

19. An apparatus comprising:
    a processor to selectively cull regions of a lens from which a convex polygon to be rendered is not visible, based on computation cost and generating an image for display by inside testing only samples from regions on the lens that were not culled; and
    a storage coupled to said processor.

20. The apparatus of claim 19 wherein said apparatus is a graphics processor.

21. The apparatus of claim 19, said processor to perform a tile test for stochastic rasterization by using up to two sets of separate planes between a tile and a triangle, including a first set of planes aligned to tile edges and a second set of planes aligned to triangle edges.

22. The apparatus of claim 21, said processor to evaluate the computation cost of performing cull tests using the second set of planes.

23. The apparatus of claim 22, said processor to evaluate the computation cost of sample testing for samples that can be culled by the second set of planes but not by the first set of planes.

24. The apparatus of claim 23, said processor to perform tile edge testing by determining if a cost of performing culling tests using the second set of planes is greater than sample testing for samples that can be culled by the second set of planes but not by the first set of planes.

25. The apparatus of claim 19, said processor to estimate a screen surface area that can be culled by a tile edge test for a given triangle, compute a screen space projection of a triangle vertex as a function of lens coordinates, compute an area of an axis aligned bounding box containing a projected edge, and compute the average area that can be culled from the projected edge.

26. The apparatus of claim 25 including a general stochastic rasterizer to selectively enable a culling test based on hyperplanes defined by a triangle edge undergoing a transformation governed by a set of stochastic parameters and a tile corner.

27. The apparatus of claim 26 including a general stochastic rasterizer to selectively enable a culling test based on hyperplanes defined by a moving triangle edge and a tile corner.

28. The apparatus of claim 27 including a general stochastic rasterizer to selectively enable a culling test based on hyperplanes defined by a moving and defocused triangle edge and a tile corner.

* * * * *

UNITED STATES PATENT AND TRADEMARK OFFICE
CERTIFICATE OF CORRECTION

PATENT NO. : 9,165,348 B2  
APPLICATION NO. : 13/995192  
DATED : October 20, 2015  
INVENTOR(S) : Robert M. Toth, Tomas G. Akenine-Moller and Carl J. Munkberg Page 1 of 1

It is certified that error appears in the above-identified patent and that said Letters Patent is hereby corrected as shown below:

In the claims
Col. 13, line 2: insert --ing-- after cull.

Signed and Sealed this
Ninth Day of August, 2016

Michelle K. Lee
*Director of the United States Patent and Trademark Office*